United States Patent [19]
Hill

[11] Patent Number: 5,773,905
[45] Date of Patent: Jun. 30, 1998

[54] MULTIPHASE ELECTRIC MACHINE WITH PREFABRICATED CO-AXIAL SLOT BARS CONNECTED BY PREFABRICATED CONNECTING CONDUCTORS

[76] Inventor: Wolfgang Hill, Ortenbergstrasse 3, D-76135 Karlsruhe, Germany

[21] Appl. No.: 430,847

[22] Filed: Apr. 6, 1995

Related U.S. Application Data

[63] Continuation of PCT/EP93/02675 Sep. 30, 1993, abandoned.

[30] Foreign Application Priority Data

Oct. 9, 1992 [DE] Germany ............................ 42 34 175.2
Oct. 9, 1992 [DE] Germany ............................ 42 34 129.9

[51] Int. Cl.$^6$ ...................................................... H02K 3/04
[52] U.S. Cl. ............................. 310/201; 310/42; 310/179
[58] Field of Search .................................... 310/211, 212, 310/215, 201, 202, 206, 179, 42

[56] References Cited

U.S. PATENT DOCUMENTS

| | | | |
|---|---|---|---|
| 3,193,714 | 7/1965 | Hoven | 310/236 |
| 3,612,925 | 10/1971 | Swanke | 310/42 |
| 4,115,915 | 9/1978 | Godfrey | 29/596 |
| 4,398,112 | 8/1983 | Van Gils | 310/201 |
| 5,331,244 | 7/1994 | Rabe | 310/180 |
| 5,422,526 | 6/1995 | Kawabata et al. | 310/201 |
| 5,616,977 | 4/1997 | Hill | 310/179 |

FOREIGN PATENT DOCUMENTS

| | | |
|---|---|---|
| 745302 | 2/1956 | United Kingdom . |
| 1281691 | 7/1972 | United Kingdom . |

*Primary Examiner*—Steven L. Stephan
*Assistant Examiner*—Jonathon Link

[57] ABSTRACT

Known electric machines having co-axial slot bars linked by added connecting conductors have a high number of junctures with small contact surfaces, so that their production costs and susceptibility to interference is increased. Connecting conductors (44–46) prefabricated as moldings without bending radii abut each other separated only by thin insulating layers, and their total surface area is used for current conduction by varying their rectangular conducting cross section. The conductor lanes (39, 40) run either in meander-shaped layers or figure-eight loops. The proportion of insulating material in the connector heads and the number of different connecting conductor designs (41–46) can be minimized by divided bars and the number of junctures can be reduced by half by prefabricating units (41, 42, 43) in a single piece. Large contact surfaces whose conical design further facilitates the mounting process results from the axial increase in the cross section of the conductor at the ends of the connecting conductors. By arranging the enlarged cross sections (69) of the conductor lanes from adjacent grooves axially behind one another, all junctures are located in the outer halves of the connector heads and are accessible anytime for purpose of measurement and post-production adjustment.

11 Claims, 8 Drawing Sheets

MULTIPHASE ELECTRIC MACHINE WITH PREFABRICATED CO-AXIAL SLOT BARS CONNECTED BY PREFABRICATED CONNECTING CONDUCTORS

This is a continuation of International Application PCT/EP93/02675, with a international filing date of Sep. 30, 1993, now abandoned.

BACKGROUND OF THE INVENTION

1. Field of the Invention

The invention concerns a multiphase electric machine with co-axial slot bars which, at least on one side of the machine, are joined to each other by attached connecting conductors.

2. Description of the Prior Art

Structural design and configuration of the conductors play a significant role in the increase of power density in highly efficient electric machines.

U.S. Pat. No. 4,115,915 describes a process in which co-axial slot bars are joined by curved shaped conductors which are glued to insulating plates. The large number and the structural design of the junctures in this process, however, entail high production costs and increase the susceptibility to interference.

The invention is, therefore, based on the objective to advance the development of an electric machine with co-axial slot bars in such a manner that high power density with concurrently low losses as well as cost effective and simple production, including good accessibility for control and post-production adjustment, is achieved.

SUMMARY OF THE INVENTION

In accordance with the invention, this objective is achieved by designing the connecting conductors as prefabricated molded parts without bending radii and with variable cross sections in such a manner, that in the connector heads abutting the face of the soft magnetic body the conductor parts of said connector heads being coated only with a thin insulating layer abut each other tangentially and axially, thereby ensuring that nearly complete utilization of available space and short length of the conductors is achieved. By configuring the conductor in meander-shaped layers or figure-eight loops, the connector head space is uniformly utilized for current conduction, and, by employing divided bars, the proportion of insulating material in the connector heads and the number of different connecting conductor designs is minimized. Prefabricated units decrease the number of junctures to be realized in the assembly by one half to the number of slot bars which ensures that in configurations with bisected connector heads all junctures to be realized in the assembly will be accessible for purposes of testing and repairs at any time later. Further, welding of the conductor parts is significantly improved by the axial enlargement of the ends of the connecting conductors and the conical design of the contact surfaces.

In the description, all connecting conductors which connect slot bars of two grooves of adjoining pole pitches in a link layer are designated as sectors. Connector heads with oshaped sectors not only utilize the space on the plane of the yokes of the soft magnetic body but also the space on the plane of the air gap and the magnets.

The drawings present advantageous embodiments of the invention.

DETAILED DESCRIPTION OF THE PREFERRED EMBODIMENT

Figure 1:
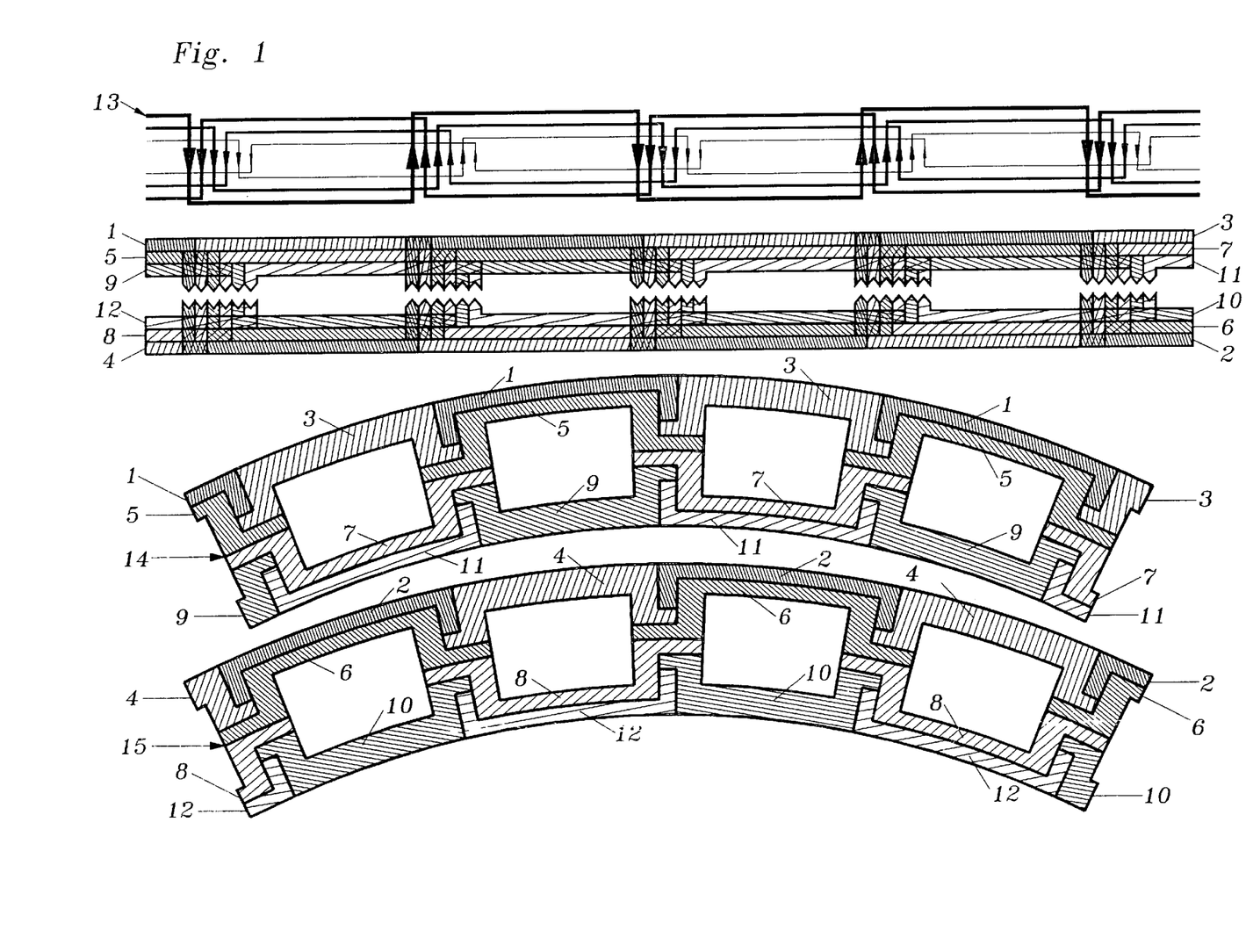
FIG. 1 shows the conductor configuration and the lateral views of the link layers of a conductor lane with offset layers.

FIG. 1 shows a cutout of the progression of a conductor lane (13) in layers and the lateral views of its two planes of links (14, 15) for which a 6-phase conductor design with six slot bars per groove ($Z_N=6$) was chosen. The connector heads are bisected as is recognizable from the large windows in the oshaped sectors in the anterior plane of links (15) as well as in the posterior plane of links (14). The conductor elements which by their serial connection form the conductor lane (13) are numbered (1) through (12). If a current — as symbolized by the arrows — enters at the upper left of the depicted sectional cutout, it flows, beginning in the first layer consisting of conductor elements (1) and (2), in a meander-like path from left to right, then in the second layer in conductor elements (3) and (4) from right to left, etc. Each layer consists, therefore, of the serial connection of all slot bars of a phase which have the same distance to the air gap. The link space is completely and evenly utilized for current conduction in that the currents in the successive layers are flowing in tangentially opposite directions. The connecting conductors thereby utilize the space in the connector heads, that in the soft magnetic body is occupied by the teeth. The change of layers occurs outside the cutout in alternating conductors having asymmetrical ends. The hatching of the elements conducting current from left to right is more dense. Also, the hatching angle decreases with decreasing voltage.

Another return variant which allows minimization of the various connecting conductor designs concurrently with even utilization of the connector head shows a figure-8 progression in one or two layers. For an odd $Z_N$, the conductor lane encircles the circumference of the machine only once in forward and backward directed loops and is therefore designated as single layer. For an even $Z_N$, the conductor lane encircles the circumference of the machine after the first looped cycle a second time in tangentially opposite direction and is therefore designated as two layer.

Figure 2:
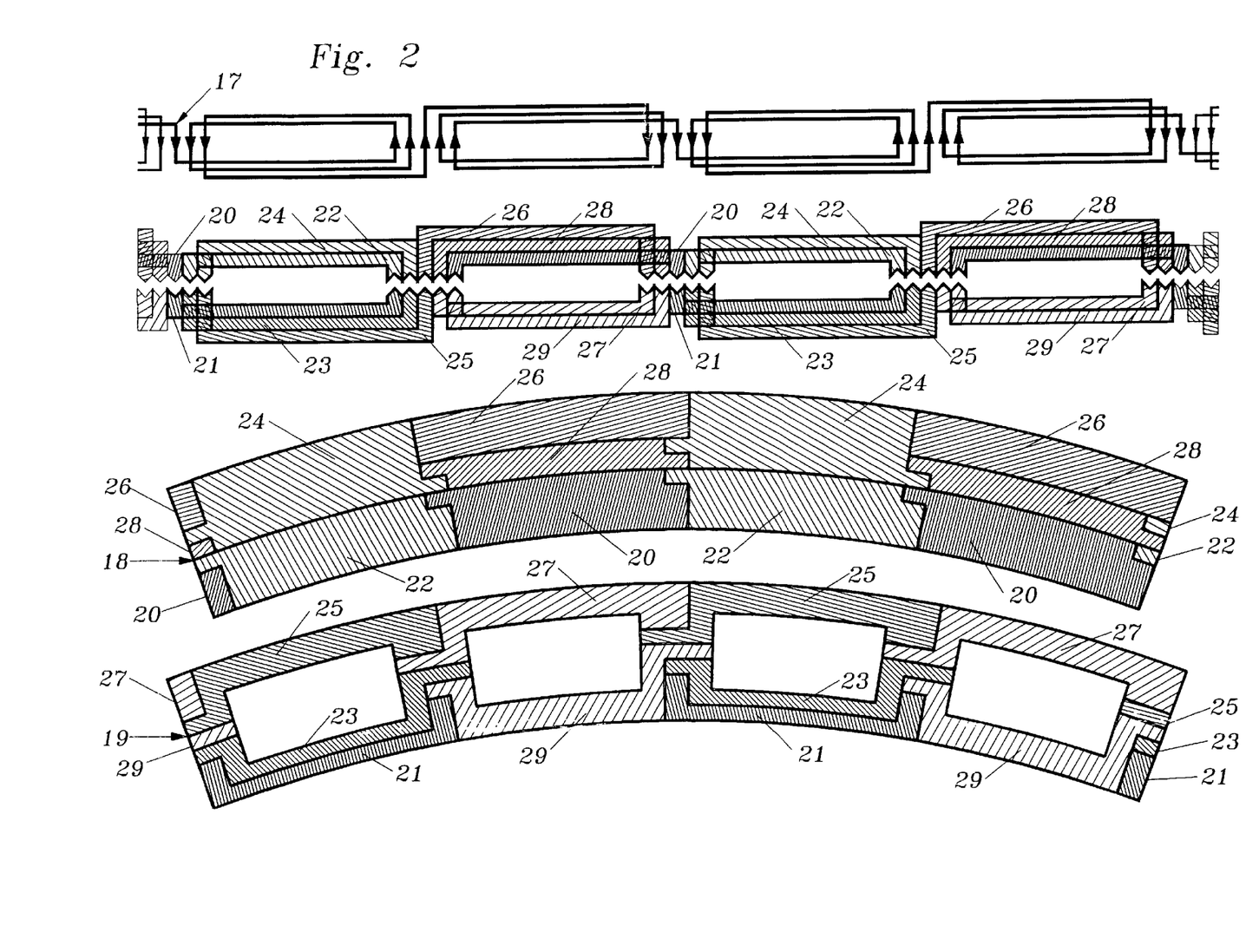
FIG. 2 shows the conductor configuration and the lateral views of the link layers of a conductor lane with figure-eight loops.

FIG. 2 shows a sectional cutout of a conductor lane with single layer FIG.-8 progression from a 5-phase machine without bisected connector heads wherein the plane of links (19) shown on the bottom is the innermost plane of links of the anterior connector head and the plane of links (18) shown above it is the outermost plane of links of the posterior connector head. While the inner plane of links (19) only occupies each of the full tooth surfaces to the left and right of the slot bars contacted by said plane of links, the outer plane of links (18), not having to allow for slot bars of other conductor lanes, can utilize the entire height of the connector head. In the illustration, the current enters the depicted sectional cutout of the conductor lane (17) in the upper left and flows in two adjacent pole pitches through ten conductor elements in the sequence from (20) to (29). The current changes its tangential direction of flow at almost every pass through the soft magnetic body. Only when passing from conductor element (20) to (21) and from (25) to (26) does it maintain its predominant direction from left to right. At these locations, the rotational direction of the loops reverses instead. The conductor elements (20) and (22), or (25) and (27) respectively, are identical, and alternating conductors are not required, so that every plane of links consists of only four different conductor designs.

Figure 3:
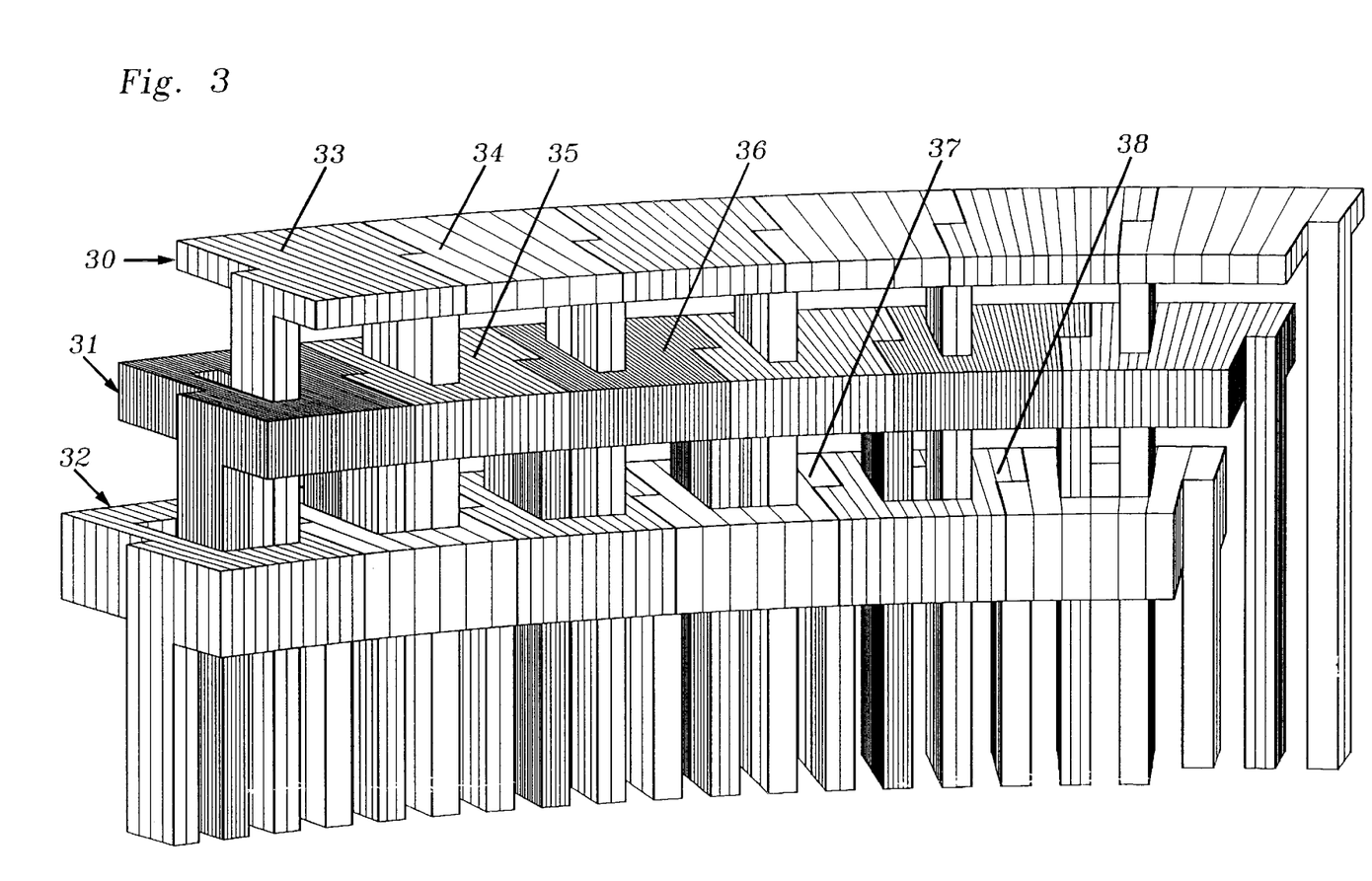
FIG. 3 shows a cutout from the connector head of a two-layer, 3-phase machine with o-shaped connecting conductors.

In FIG. 3, a cutout comprising six pole pitches of the connector head of a 3-phase machine without bisected connector heads is depicted three-dimensionally. The planes of links (30, 31, 32) which abut after sliding them together are depicted with a distance between them in order to show their structural design. Further, for better visualization, all planes of links consist of units (33–38) each of which connect slot bars having different distances to the surface of the groove openings whereby all conductor elements of a plane of links are of identical design. In a plane of links the current flows in tangentially successive conductor elements in different directions. In the depicted design, the non-intersecting outer planes of links (30) cover the entire external surface. Alternatively, the two outer planes of links may, however, have windows, as in bisected connector heads, through which enlargements of the conductor cross section of the next to outermost planes of links can axially extend to the outside. If the inner planes of links are constructed from units, all junctures to be realized in the assembly can be accessed from the outside. The large rectangular cross sections of the conductor and the abutting conductor parts result in high power density and low ohmic losses respectively as well as a robust construction of the entire conductor assembly wherein, additionally, the dissipation of waste heat via the soft magnetic body or directly to an adjacent cooling body is improved. Because of the unilateral skin effect it might be necessary to use divided bars for the desired groove depth.

Figure 4:
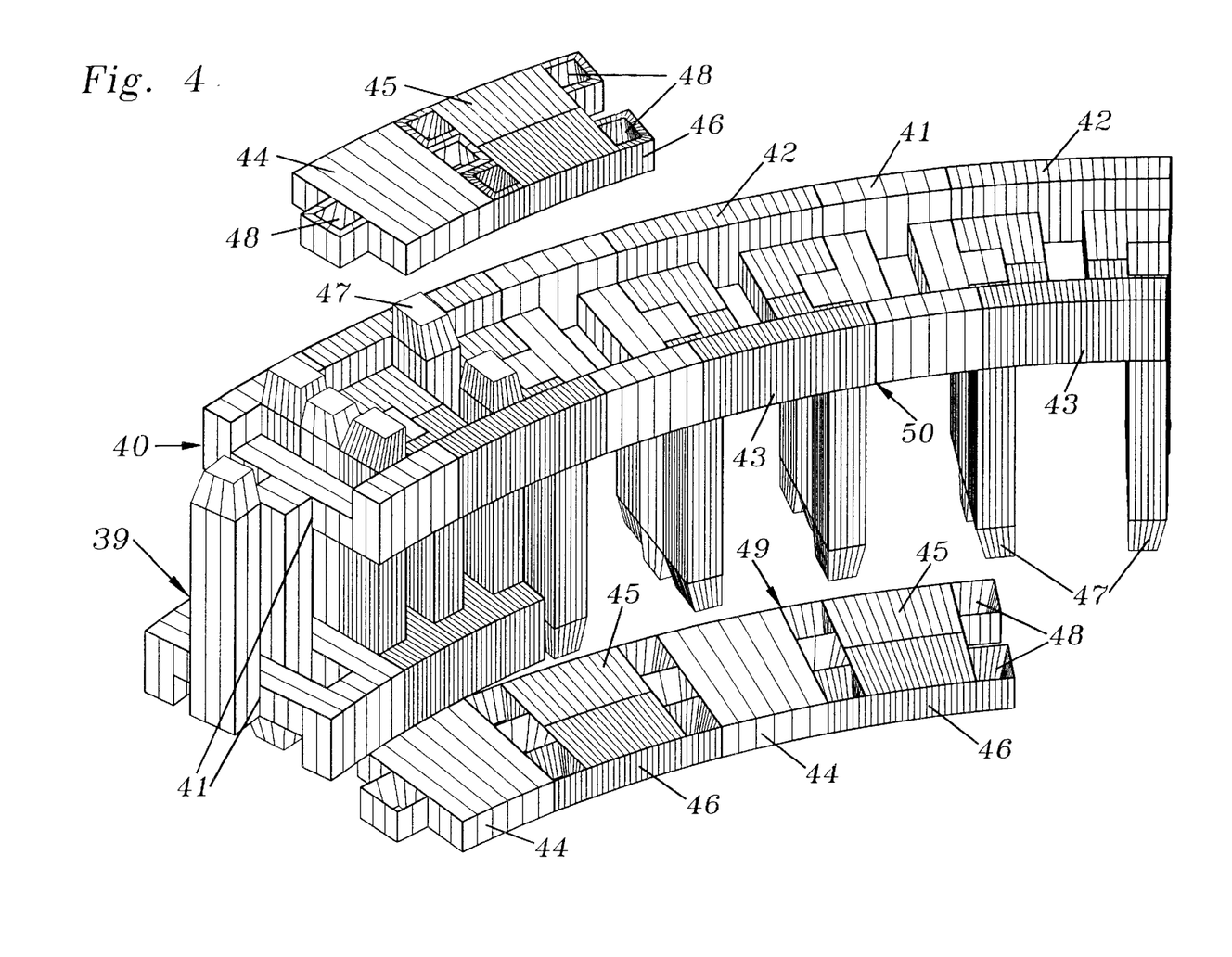
FIG. 4 shows a cutout from the two conductor lanes of a three-layer, 2-phase machine with o-shaped sectors.

FIG. 4 shows a sectional cutout of the two conductor lanes (39) and (40) of a 2-phase machine depicting two pole pitches of the one conductor lane (39) but six pole pitches of the other conductor lane (40). The symmetric ends of the conductor elements indicate a return variant with offset layers. A special feature is that the link space is exclusively utilized by the axially widened links of the units (41, 42, 43), while the non-intersecting connecting conductors (44, 45, 46) are limited to the connector head space at the level of the groove height. Here, the links of the units (41, 42, 43) lie radially above as well as below the groove height, indicating a structural design with oshaped sectors. The ends of the units (47) have a conical shape and are enclosed on all four sides by the recesses (48) of the connecting conductors. During the pressing together, the unavoidable manufacturing tolerances are being compensated by a minor deformation of the soft conductor material thereby creating favorable conditions for the local melting-on of the junctures. After the two conductor lanes (39, 40) on the left side of the cutout are axially slid together, they form compact, solid connector heads in which the planes of links of the connecting conductor (49) lie radially inside the unitary planes of links (50). The two conductor lanes are of identical design.

Figure 5:
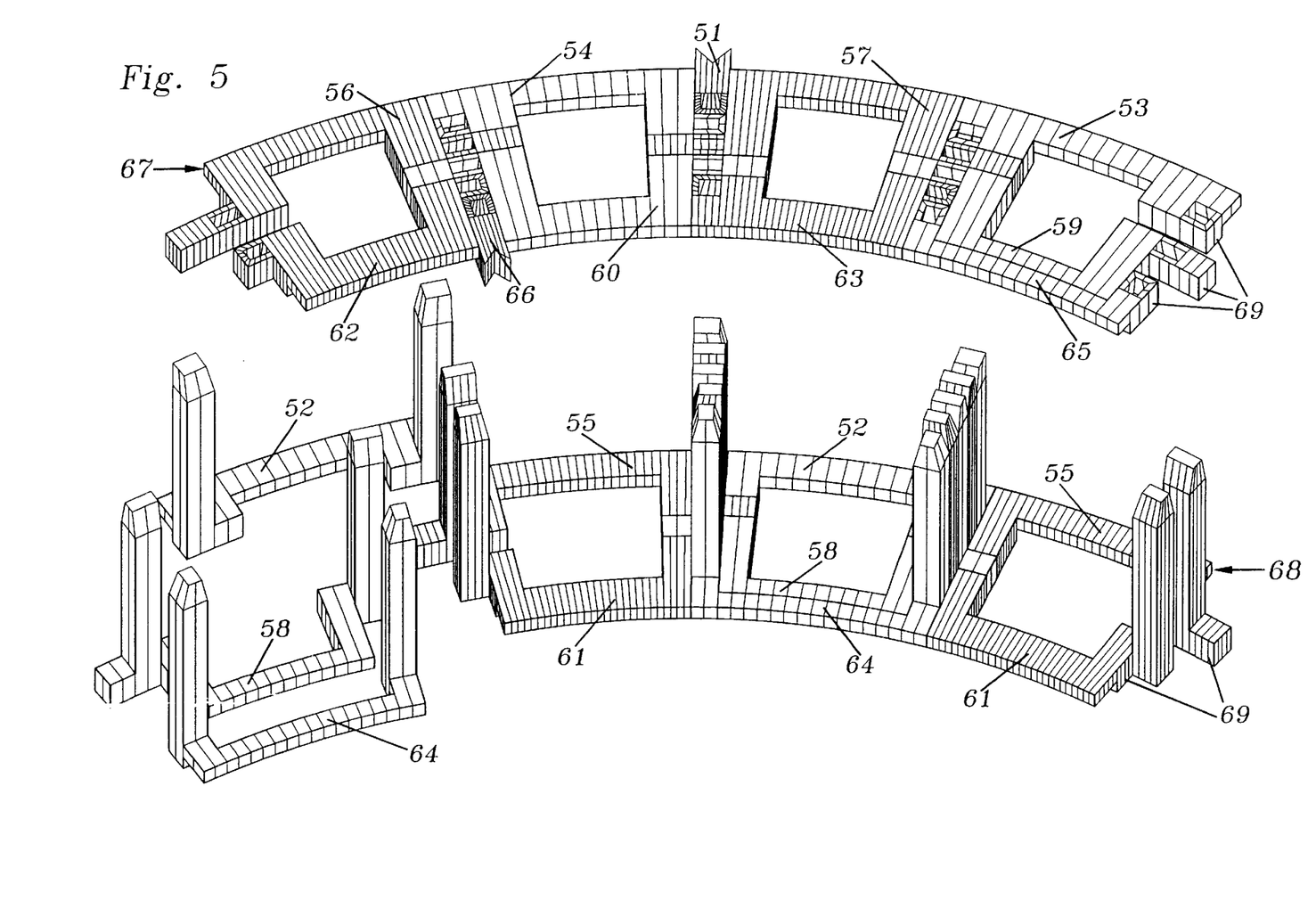
FIG. 5 shows the cutout with alternating conductors from a conductor lane of a 4-phase machine with bisected connector heads and o-shaped sectors.

FIG. 5 shows a conductor lane of a five-layer, 4-phase machine in which the chosen cutout contains alternating conductors. The axial enlargement of the conductor cross section of the ends of the connecting conductors which lie at the level of groove height contributes to better utilization of space in the conductor heads and doubles the surface of contact between connecting conductors and slot bars, the enlargement of the conductor cross section (69) in the inner plane of links (68) being executed narrower by one groove width than in the outer plane of links (67). Since the axial enlargements of their conductor cross sections (69) point in the direction to the soft magnetic body, their supply conductors (51, 66) and the alternating conductors (54, 57, 60, 63) lie in the outermost plane of links (67). The current enters through the supply conductor (51) shown in the top center into the conductor lane, passes in the first layer which consists exclusively of the unitary structural design (52) and the connecting conductor design (53) through the entire circumference of the machine and changes directly at the entry groove through the first alternating conductor (54) into the second layer. Said second layer in turn consists of two conductor elements (55) and (56) and is passed through in opposite direction around the entire circumference of the machine. All four alternating conductors (54, 57, 60, 63) are connected at the end of their layer to slot bars of the entry groove, however, the last layer terminates directly in the second supply conductor (66) instead in an alternating conductor. While due to the two alternating sectors in the plane of links of the connecting conductor (67), the number of different conductor element designs increases to 11 (5 connector +4 alternating +2 supply), the unitary plane of links (68) consists of only five different structural designs.

Figure 6:
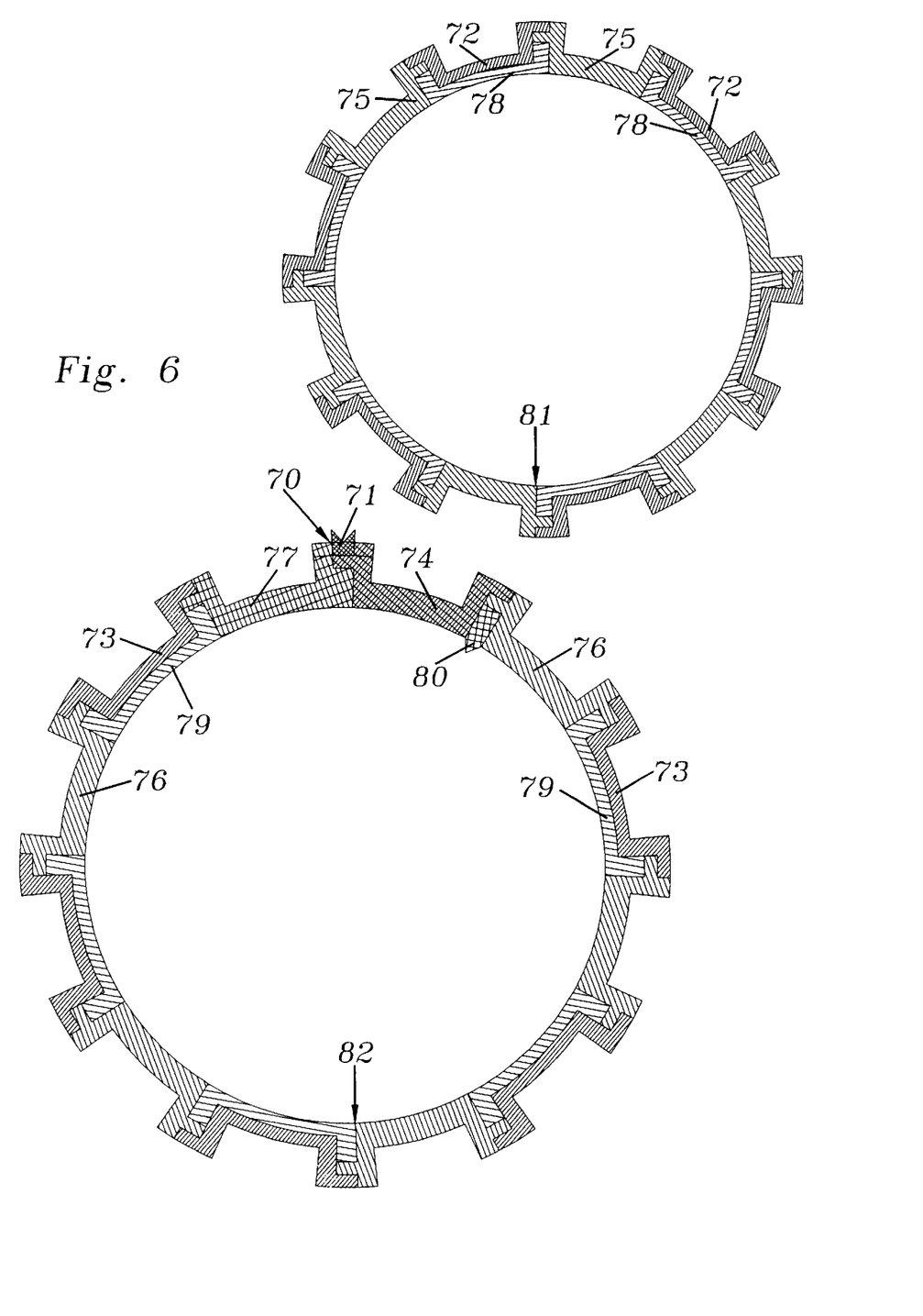
FIG. 6 shows the lateral views of the two link layers of a three-layer conductor lane from a 4-phase, 12-pole machine with u-shaped connecting conductors.
Figure 7:
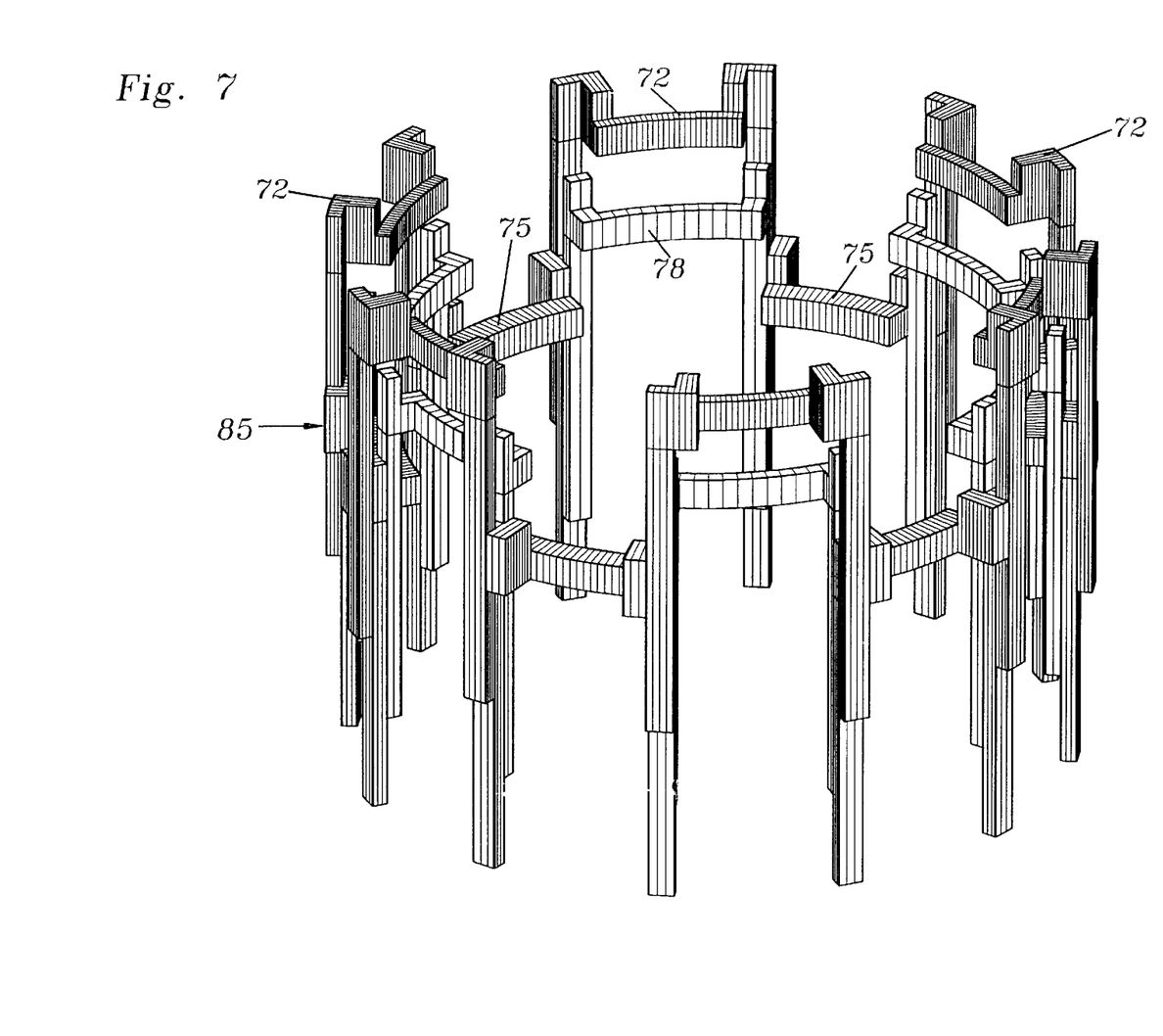
FIG. 7 shows all units of the conductor lane from FIG. 6 during sliding together into a unitary link layer.
Figure 8:
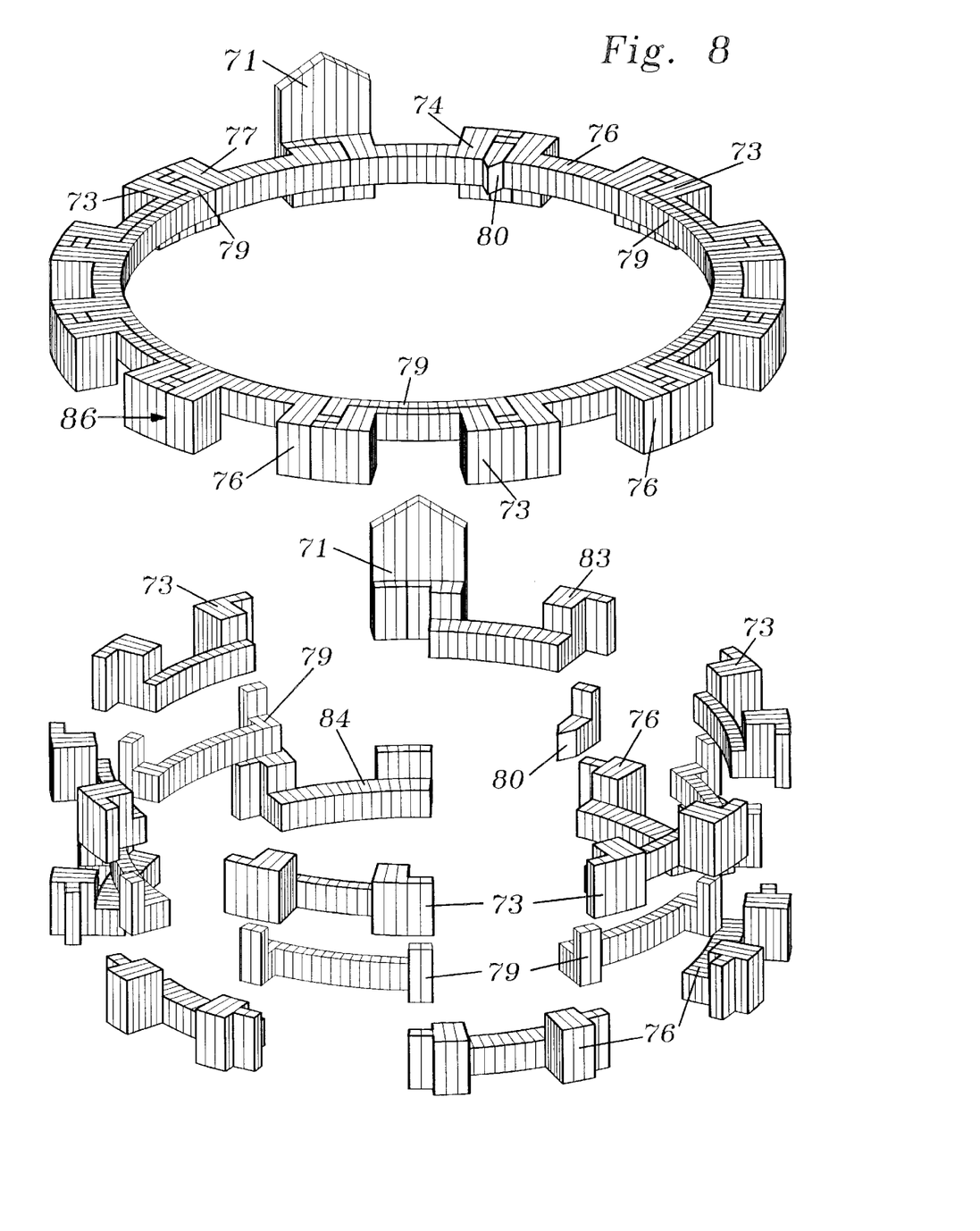
FIG. 8 shows all connecting, alternating, and supply conductors of the two link layers of the outer half of a connector head of the machine in FIG. 6.

In FIGS. 6, 7, and 8 the structural design of an annular conductor design is illustrated in the example of a 4-phase, 12-pole machine with bisected connector heads and unshaped sectors for which a conductor progression with offset layers of $Z_N=3$ was chosen.

FIG. 6 shows the face view of the two planes of links (81, 82) of the conductor lane (70). The unitary plane of links (81) depicted on the top right is part of the inner half of the posterior connecting head and is shown in somewhat reduced size. Said unitary plane of links does not have alternating sectors and consists advantageously of three unitary structural designs (72, 75, 78). The plane of links of the respective connecting conductor (82) is shown on the bottom left. Besides the three connecting conductor designs (73, 76, 79) it consists of two alternating conductors (74, 77) as well as two supply conductors (71, 80) in the two top sectors. In total, the conductor lane consists, therefore, of 10 different structural conductor designs (3 unitary +3 connector +2 alternating +2 supply). Conductor elements of the same layer are hatched at the same angle.

FIG. 7 shows how the plane of links (81) of the inner half of the connector head is assembled from the three unitary structural designs (72, 75, and 78). It becomes obvious how the sliding together of the conductor parts results in a self-supporting, solid package (85) which together with the second unitary plane of links which belongs to the same half of the connector head simplifies the subsequent assembly process into the soft magnetic body. If the units are seated in the grooves free of play, additional fixing, e.g. by adhesive layers, can be dispensed with.

In the upper part of FIG. 8 the plane of links of the connecting conductor belonging to the unitary plane of links from FIG. 7 is shown already assembled into a compact package (86). Below said plane of links are depicted the conductor elements of the next to outer plane of links in an axially offset arrangement wherein the conductor elements of a layer are shown in an axial plane. During the process of sliding them together, it becomes obvious that all conductor elements of the outer half of the connector head form together a compact annular disk. After sliding the unitary packages (85) into the soft magnetic body, these disks are axially pressed onto their ends. All connections are accessible from the outside and can be melted on by e.g. a laser beam or electron beam, which results in very low internal resistance values of the completed conductor lane. If the resistance values are too high, post-production adjustment by repeated targeted melting on and/or local application of conductor material is possible. The recesses for the slot bar ends are not shown. In both planes of links, the three connecting conductor designs (73, 76, 79) and the two supply conductors (71, 80) are identical, due to their symmetric ends, while the alternating conductors (74, 77 or, respectively 83, 84) are differentiated. The entire conductor design requires fifteen conductor element designs (6 unitary +3 connector +4 alternating +2 supply) regardless of the number of pole pairs.

I claim:

1. A multiphase electric machine comprising:
   co-axial slot bars having straight ends and connecting conductors, wherein said co-axial slot bars and said connecting conductors form conductor lanes;
   said multiphase electric machine further comprising: a soft magnetic body having a face side and in front of said face side a head region, in which said connecting conductors connect the ends of said co-axial slot bars;
   said connecting conductors and said co-axial slot bars consist of prefabricated conductor parts;
   said conductor lanes have a variable cross section and form outside the magnetic body head regions;
   wherein on at least one side of said multiphase electric machine said co-axial slot bars are joined to each other by attaching said connecting conductors to said straight ends of said co-axial slot bars, wherein said head regions of said conductor lanes lie axially in front of said face side of said soft magnetic body;
   wherein said connecting conductors are separated from each other in tangential and axial directions by only a thin layer of adhesive and/or a thin insulating layer and wherein said connecting conductors abut each other and are connected to said straight ends of said co-axial slot bars;
   wherein said connecting conductors, when assembled together, form a number of planes of links in the head region;
   wherein all of said connecting conductors in a given one of said planes of links belong to the same electric phase;
   wherein said number of the planes of links corresponds to the number of slots in each pole pitch;
   and wherein at least two of said coaxial slot bars, of differing electric phase are arranged in each pole pitch.

2. The multiphase electric machine as recited in claim 1, wherein all of said number of planes of links constitute complete annular packages in which the number of said connecting conductors between any two tangentially sequential sections of any one of said number of planes of links is differentiated by, at most, one of said connecting conductors.

3. The multiphase electric machine as recited in claim 1, wherein the connection of said head regions of said connecting conductors forms an annular disk with a rectangular cross section;
   wherein the volume of said annular disk contains, besides conductor material, only thin adhesive and insulating layers.

4. The multiphase electric machine as recited in claim 1, wherein only one of said co-axial slot bars is connected in series between two other successive said co-axial slot bars, said only one of said co-axial slot bars is part of a pole pitch which is different from the pole pitch of said two other successive said co-axial slot bars, said pole pitch of said successive said co-axial slot bars have two adjacent pole pitches wherein, return of electric current occurs through at least one of said only co-axial slot bars in each of said adjacent pole pitches of said pole pitch of said two other successive co-axial slot bars.

5. The multiphase electric machine as recited in claim 1, wherein each second one of said connecting conductors of one of said conductor lanes form together with two of said co-axial slot bars to which it is conductively connected a prefabricated unit.

6. The multiphase electric machine as recited in claim 1, wherein at the location where said connecting conductors join with said straight ends of said co-axial slot bars, said conductor lane has a cross section that is larder, in a tangential direction, than a cross section of said co-axial slot bars;
   and wherein, at the location where said connecting conductors join with said straight ends of said co-axial slot bars, said conductor lane has a cross section that is larger, in an axial direction, than a cross section of said connecting conductors in said plane of links.

7. The multiphase electric machine as recited in claim 6, wherein the portion of said conductor lane that is larger in axial cross section of conductor lanes of adjacent grooves partially axially abuts a similar portion of a said conductor lane from an adjacent slot;
   wherein, said axially abutting portions of said conductor lanes together constitute the axial extent of said head region of said connecting conductors and thereby bisect said head region axially;
   and wherein each of said co-axial slot bars constitutes the inner half of the tangential width of said head region, at one end, and
   the outer half of the tangential width of said head region at the other axial end.

8. The multiphase electric machine as recited in claim 1, wherein the cross section of said straight end of said co-axial slot bars tapers conically towards the tip; and a portion of said connecting conductors is tapered to receive a conically tapered portion of said straight end of said co- axial slot bars.

9. The multiphase electric machine as recited in claim 1 wherein, a supply conductor is connected to one of said conductor lanes and
   wherein at least one of said supply conductor is directly connected with a supply conductor of another of said conductor lanes belonging to an adjacent slot.

10. A multiphase electric machine comprising:
    co-axial slot bars having straight ends and connecting conductors, wherein said co-axial slot bars and said connecting conductors form conductor lanes;
    said connecting conductors and said co-axial slot bars consist of prefabricated conductor Parts;
    said multiphase electric machine further comprising: a soft magnetic body having a face side;
    wherein at least two of said co-axial slot bars, of differing electric phase are arranged in each pole pitch,
    wherein a number of layers are formed;

each of said consists of the serial number of layers consists of:
- at least three of said co-axial slot bars; each one of said at least three of said co-axial slot bars is located in a different pole pitch; and the corresponding said connecting conductors of each one of said at least three of said co-axial slot bars;
- wherein, said conductor lane consists of the serial connection of said number of layers corresponding to the number of said co-axial slot bars per pole pitch;
- and wherein, the current flow in abutting said number of layers is in opposite directions.

11. A multiphase electric machine comprising:

co-axial slot bars having straight ends and connecting conductors, wherein said co-axial slot bars and said connecting conductors form conductor lanes;

said connecting conductors and said co-axial slot bars consist of prefabricated conductor parts;

said multiphase electric machine further comprising: a soft magnetic body having a face side;

said conductor lanes have a variable cross section and form outside the magnetic body head regions;

wherein on at least one side of said multiphase electric machine, said co-axial slot bars are joined to each other by attaching said connecting conductors to said straight ends of said co-axial slot bars, wherein said head regions of said conductor lanes lie axially in front of said face side of said soft magnetic body;

wherein at least two of said co-axial slot bars, of differing electric phase, are arranged in each pole pitch;

and wherein said co-axial slot bars are designed as divided bars.

* * * * *